United States Patent [19]

Dziuba et al.

[11] 4,399,715
[45] Aug. 23, 1983

[54] POWER TAKE-OFF

[75] Inventors: Peter Dziuba, Überlingen; Herbert Simon, Friedrichshafen, both of Fed. Rep. of Germany

[73] Assignee: Zahnradfabrik Friedrichshafen AG, Friedrichshafen, Fed. Rep. of Germany

[21] Appl. No.: 161,384

[22] Filed: Jun. 20, 1980

[30] Foreign Application Priority Data

Jun. 21, 1979 [DE] Fed. Rep. of Germany ....... 2924939

[51] Int. Cl.³ .................. F16H 37/00; F16D 67/04
[52] U.S. Cl. ............................ 74/15.66; 192/18 A
[58] Field of Search .............. 74/15.6, 15.66, 15.82, 74/15.88; 192/13 R, 18 A, 18 R

[56] References Cited

U.S. PATENT DOCUMENTS

| 2,221,014 | 11/1940 | Williamson | 192/18 A |
|---|---|---|---|
| 2,436,968 | 3/1948 | Longfield | 192/18 A |
| 3,209,872 | 10/1965 | Moyer et al. | 192/18 A |
| 3,494,450 | 2/1970 | Mankowsky et al. | 192/18 A |
| 3,507,372 | 4/1970 | Gilbertson et al. | 192/18 A |
| 3,638,773 | 2/1972 | Lewis et al. | 192/18 A |
| 3,698,524 | 10/1972 | Schubert | 192/18 A |
| 3,713,517 | 1/1973 | Sommer | 192/18 A |
| 4,108,291 | 8/1978 | Zenker | 192/18 A |

FOREIGN PATENT DOCUMENTS

| 2634057 | 2/1978 | Fed. Rep. of Germany | 74/15.66 |
|---|---|---|---|
| 1442489 | 7/1976 | United Kingdom | 192/18 A |
| 471217 | 8/1975 | U.S.S.R. | 192/18 A |

*Primary Examiner*—Kenneth Dorner
*Attorney, Agent, or Firm*—Karl F. Ross; Herbert Dubno

[57] ABSTRACT

In a power take-off a spring engages a hydraulically actuated clutch-activating pressure plate to force the same into a neutral position. In one embodiment of the invention a hydraulically operated spring-loaded piston for arresting the rotational motion of an output shaft engages the pressure plate upon shifting thereof into its neutral position and consequent uncoupling of the output shaft from an input or drive shaft. In another embodiment of the invention an annular friction disk slidably connected or splined to the output shaft for stopping the same is clamped between a brake housing and a hydraulically actuated piston. The pistons automatically retract under the action of respective springs upon shut-off of the vehicle engine driving the input shaft and energizing the hydraulic system actuating the plates and the pistons, whereby the angular position of the output shaft may be manually adjusted.

6 Claims, 4 Drawing Figures

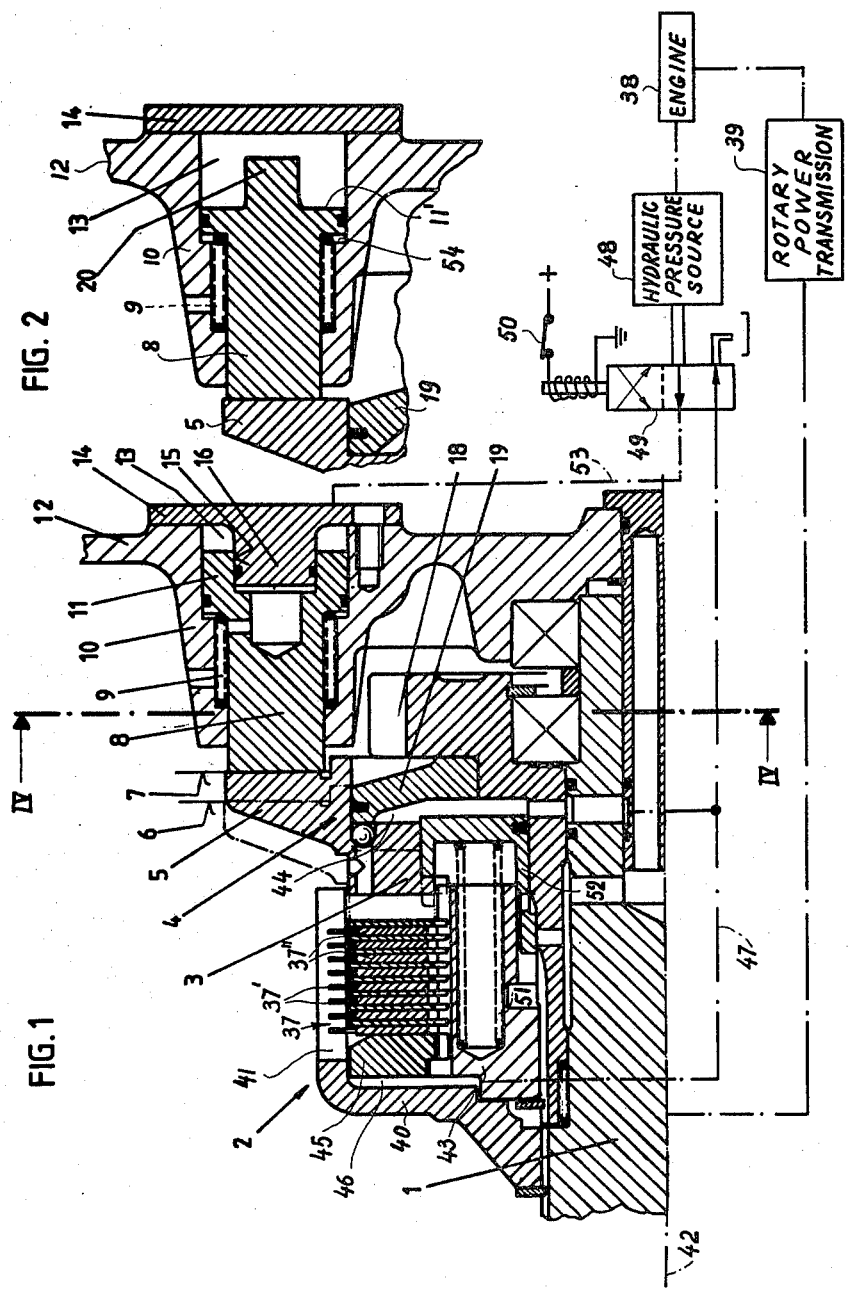

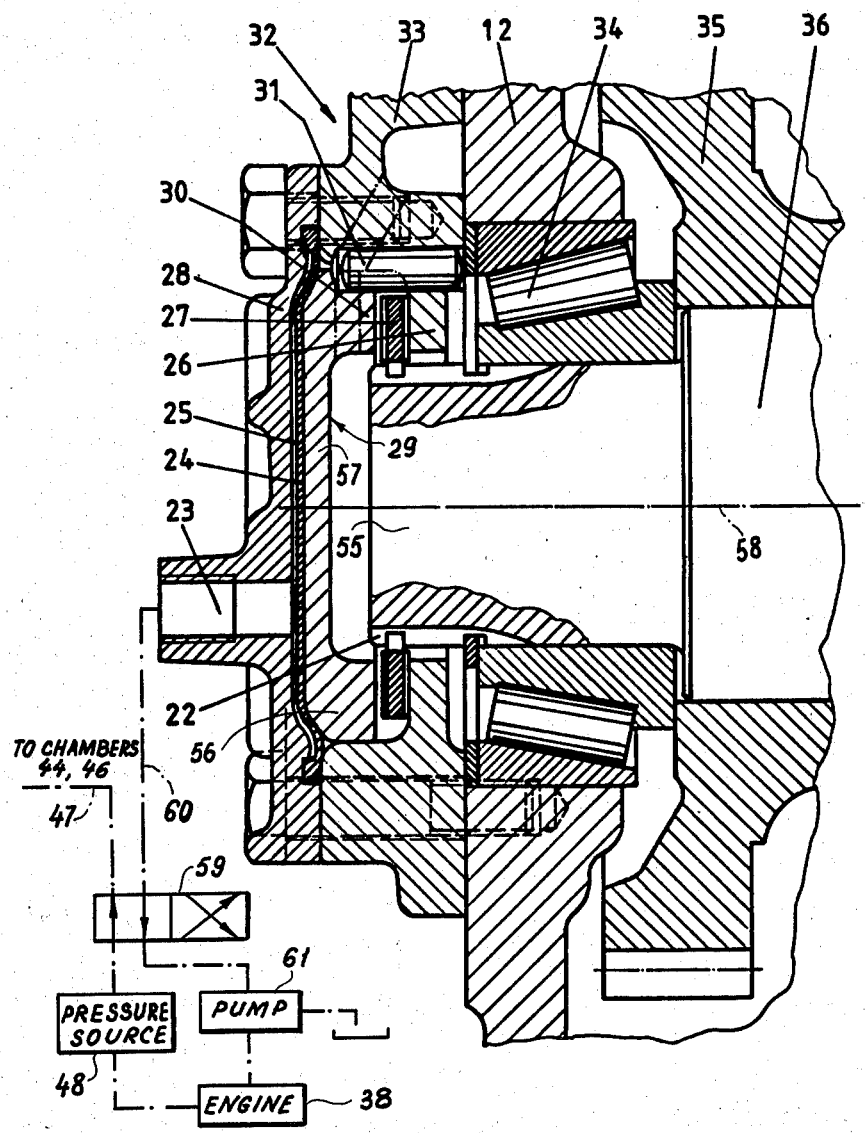

POWER TAKE-OFF

FIELD OF THE INVENTION

Our present invention relates to a power take-off for use in agricultural and construction vehicles.

BACKGROUND OF THE INVENTION

Construction and agricultural vehicles such as tractors are usually provided with a step-down geared auxiliary transmission known as a power take-off. The power take-off is directly connected to the vehicle engine and has an output shaft or power take-off shaft connectable to ancillary construction and farming devices such as cranes and harvesting equipment. A coupling between the engine and the power take-off shaft is actuatable independently of the vehicle drive. Frequently the power take-off coupling includes a wet-type disk clutch which in a disengaged or uncoupled state exerts a drag force on the power train driving the output shaft, whereby the same continues to rotate. This rotation is a potential cause of accidents.

One attempt to remove this source of accidents, described in German patent document (Auslegeschrift) DT-AS No. 2,522,411 (see U.S. Pat. No. 4,108,291), involves the application of a braking force to a nonsliding cylinder member of the power take-off coupling upon disengagement thereof. A brake shoe pushes against the cylinder under the action of a spring and is retracted or shifted away from the cylinder by pressurized fluid actuating the coupling. Upon disengagement of the coupling via depressurization of the fluid, the brake is forced against the coupling cylinder by the compressed spring to arrest motion of the output shaft. This shaft remains locked even upon shut-off of the vehicle engine and is, therefore, at no time capable of being manually turned.

OBJECTS OF THE INVENTION

An object of our present invention is to provide an improved power take-off which has a simply and reliably operating brake for arresting the output shaft upon disengagement or uncoupling thereof from the input shaft.

Another object of our present invention is to provide such a power take-off which is spatially and financially economical and which is readily adaptable to varying uses.

Yet another object of our present invention is to provide such a power take-off in which the output shaft is arrested upon disengagement thereof from the input or drive shaft but is released upon shut-off of the engine, thereby permitting manual adjustment of the output shaft position.

SUMMARY OF THE INVENTION

A power take-off according to our present invention comprises a power transmission train rotatably journaled at least partially in a housing attached to a vehicle, the power train including an output shaft. A drive or input shaft rotatably connected to an engine of the vehicle is drivingly connected to the power train by means of a coupling including a first friction disk drivingly connected to the input shaft and a second friction disk laterally juxtaposed to the first friction disk and drivingly connected to the power output train. The coupler further includes a pressure plate juxtaposed to the disks and a spring engaging the plate for forcing the same away from the disks to uncouple the train from the input shaft. A brake is included in the housing for arresting the rotary motion of the output shaft upon uncoupling of the drive shaft and the power output train, while a hydraulic circuit or conduit system including a pressure space adjacent to the pressure plate and a pressure source energized by the vehicle engine pressurizes the space or chamber to urge, in opposition to the spring, the pressure plate against the friction disks to force them clutchingly to engage one another, whereby the input shaft is drivingly connected to the power output train.

According to a feature of our present invention the hydraulic circuit is connected to the brake for actuating the same upon an uncoupling of the power output train from the input shaft. The pressure plate is shiftable parallel to an axis of rotation of the input shaft and the brake includes a piston shiftably mounted in a brake casing on the housing for reciprocation parallel to the rotation axis to engage the pressure plate upon depressurization of the pressure space and to disengage the plate upon shut-off or de-energization of the engine. The brake further includes a restoring spring engaging the piston and the casing for returning the piston to a retracted position at least upon engine shut-off.

According to further features of our present invention, the brake casing is integrally formed on the housing, the casing and the piston are provided with arresting means for limiting the reciprocation strokes of the piston and the pressure plate includes an outwardly projecting annular flange for engaging the piston upon depressurization of the pressure space and consequent uncoupling of the power transmission train from the drive shaft. It is advantageous to provide a plurality of braking pistons shiftably mounted on the housing symmetrically about the axis for reciprocation parallel thereto.

According to another, alternative, feature of our present invention, an annular brake casing is attached to the housing at one end of the output shaft and a cover plate is secured to this casing; the brake includes a piston shiftably mounted for reciprocation parallel to an axis of rotation of the output shaft. The brake further includes a resilient membrane, preferably in the form of a prestressed leaf spring, clamped at its periphery between the cover plate and the casing, the piston having a cylindrical wall attached at one end of the membrane and partially surrounding the output shaft at an opposite end. A locking pin is provided for preventing rotation of the cylindrical piston wall. A pressure chamber is formed between the cover plate and the membrane and is connected to the pressure source for shifting the membrane and the piston toward the output shaft upon uncoupling of the power transmission train from the input shaft. Preferably, braking is effectuated by the clamping of an annular friction disk between the piston wall and an annular flange projecting radially inwardly from the casing, the annular friction disk being slidably secured or splined to the output shaft. The prestressed leaf spring functions to return the brake piston to an inactive state or position upon shut-off of the engine or upon a depressurization of the pressure chamber between the cover plate and the leaf spring. However, it is feasible to connect a pump or other depressurizer to this chamber to ensure a release of braking action upon engine de-energization and upon coupling of the power transmission train to the drive shaft.

BRIEF DESCRIPTION OF THE DRAWING

These and other features of our present invention will now be described in detail, reference being made to the accompanying drawing in which:

FIG. 1 is a partial cross-sectional view of a power take-off according to our present invention, showing a brake piston engaging a flange of a pressure plate;

FIG. 2 is a parital cross-sectional view, showing an alternative form for the brake piston of FIG. 1;

FIG. 3 is a partial cross-sectional view of another power take-off according to our present invention, showing a brake piston for engaging a friction disk gearingly meshing with an output shaft.

SPECIFIC DESCRIPTION

Figure 4:
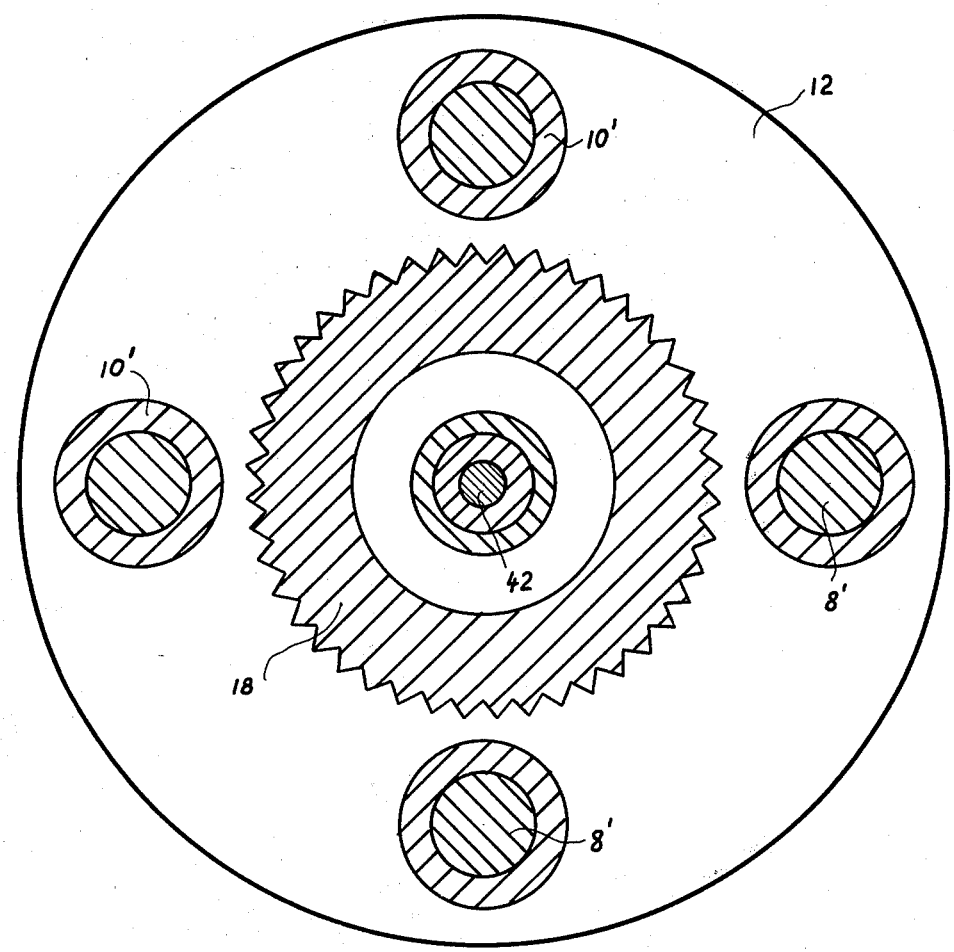
FIG. 4 is a partial cross-sectional view taken along line IV—IV of FIG. 1.

As illustrated in FIG. 1, a power take-off for agricultural and construction vehicles comprises a stack of clutch or friction plates 37 for transmitting rotary power from an input or drive shaft 1 to a power train including at an output end an output of power take-off shaft 36 (see FIG. 3). The drive shaft 1 is rotated by the vehicle engine 38 via a transmission 39 and has an arm 2 preferably in the form of an annular flange 40 with a set of longitudinal teeth 41 in a cylindrical arrangement extending parallel to an axis of rotation 42 of shaft 1. Teeth 41 mesh with several friction disks 37' of clutch assembly 37, these disks being interleaved with a similar number of disks 37" meshing with a power transmission member 43 in turn drivingly connected to a toothed gear 18. This gear meshes (compare gear 19 of U.S. Pat. No. 4,108,291), either directly or via at least one intermediate gear, with another toothed gear 35 (FIG. 3) rigid with output or power take-off shaft 36 (see elements 26 and 28 of U.S. Pat. No. 4,108,291) and is provided with an annular plate 19 which forms a wall of a pressure chamber 44 described in greater detail hereinafter.

Clutch disks 37' and 37" are locked together under the action of a pair of annular pressure plates 3, 45 slidably mounted at least in part on power transmission member 43. Plates 3, 45 move inwardly toward one another upon pressurization of chambers 44 and 46 by a fluid transferred through a conduit system 47 from a pressure source 48 via a valve 49 preferably of the electro-magnetic type manually actuatable via a switch 50. Source 48 is energized by engine 38.

A restoring spring 51 is compressed between nonslidable rotary member 43 and a slidable rotary or revolving member 52 engaging pressure plate 3 for urging the same into a declutched or disengaged position 7 in opposition to the pressure in chamber or space 44. Pressure plate 3 includes a cylindrical extension 4 which surroundingly engages an outer periphery of annular plate 19 and which has an outwardly projecting brake flange 5 for forming a friction engagement with a brake member 8 in the form of a piston slidably mounted in a brake casing 10 integrally formed with a power take-off housing 12. Piston 8 has an extension 11 with a recess 15 at an inner end for receiving a stopper or arresting lug 16 rigid with a brake-casing cover plate 14. A pressure chamber or space 13 is formed between extension 11 and plate 14 and between housing 12 and lug 16, this chamber being connected to valve 49 via a fluid channel or conduit 53. Sealing rings and gaskets are provided for sealing chambers 13, 44, 46.

Upon the closing of switch 50, conduit 53 and chamber 13 are pressurized by source 48 and valve 49 to extend brake piston 8, 11 against the action of a restoring spring 9 compressed between casing 10 and extension 11. Simultaneously, conduit system 47 is depressurized, whereby pressure plate 3, 4, 5 shifts from a coupling or engaged position 6 to disengaged position 7 owing to the force exerted by spring 51. In this disengaged position flange 5 engages brake piston 8, whereby rotary motion of plate 3, 4, 5 and of power-transmission train 43, 18, 35, 36 is arrested. Upon the turning-off of engine 38 and the consequent de-energization of source 48, spring 9 retracts piston 8, 11 until the same is stopped by arresting lug 16. The retracting of brake member 8, 11 enables manual rotation of power take-off shaft 36 while the engine 38 is not activated.

Upon the opening of switch 50, valve 49 shifts to a position wherein conduit system 44, 46, 47 is connected to source 48 and conduit 53 is opened for depressurization. Let us assume that the engine is running. Then chambers 44 and 46 are pressurized, forcing disks 37' and 37" to interlock and consequently establish a rotary-power connection between the input drive 1, 40, 41 and the output power transmission train 43, 18, 35, 36 terminating in the power take-off or output shaft 36.

As shown in FIG. 2, the arresting means for limiting the retracting stroke of the brake member 8 may alternatively comprise a lug 20 formed on an inner end of piston 8 for engaging cover plate 14. Piston 8 includes either extension 11 or a peripheral flange 11' (FIG. 2) for engaging an annular shoulder 54 in brake casing 10 for limiting the outward or extension stroke of the piston. Although it is preferable to have the brake casing 10 formed integrally with the housing 12, it is also advantageous to have the casing formed separately and then rigidly fixed to the housing by bolts (not shown).

In FIG. 3 we have illustrated an alternative braking assembly for arresting the rotary motion of power train 43, 18, 35, 36 and in particular of shaft 36, upon a disengagement of the power coupling shown in FIG. 1. Shaft 36 is rotatably journaled at one end 55 in housing 12 by means of a roller bearing 34, while a brake housing 32 including an annular casing 33 and a cover plate 28 bolted thereto is attached to housing 12. A resilient membrane or leaf spring 25 is clamped at its periphery between cover plate 28 and casing 33 and is rigidly connected to a pot- or cup-shaped piston 29 slidably mounted inside casing 33. Piston 29 comprises a cylindrical wall 56 slidably surrounding the extremity of shaft end 55 and a circular plate 57 integral with wall 56 and rigidly connected to membrane 25. Rotation of piston 29 is prevented by a key or pin 31 angularly locking the piston to brake casing 33. This casing is provided with an annular flange 26 projecting radially inwardly. An annular friction disk 27 is splined or geared to shaft end 55 between piston wall 56 and flange 26, this disk being free to slide parallel to an axis of rotation 58 of output shaft 36.

A pressure chamber or space 24 is formed between cover plate 28 and membrane 25 and communicates with pressure source 48 via a valve 59, a fluid conduit 60 and an opening 23 in cover plate 28. Valve 59 has a first position in which source 48 is connected to chambers 44 and 46 via conduit system 47 and in which a pump 61 is connected to chamber 24 for ensuring the depressurization or evacuation of fluid from this chamber. In a second position of valve 59, the braking chamber 24 is connected to the pressure source, while the coupling chambers 44, 46 are connected to the pump. Upon entering its second position, valve 59 pressurizes chamber 24, whereby piston 29 slides toward shaft end 55 to clamp friction ring 27 between flange 26 and wall 56 and consequently stop the turning of shaft 36 about axis 58. Although additional means may be provided for ensuring the evacuation of space 24 upon deactivation of the engine 38, it is preferable to form membrane 25 as a prestressed leaf spring tending to return piston 29 to a retracted or withdrawn position; thus, the brake on shaft 36 is automatically unlocked upon turning the engine off.

As illustrated in FIG. 4, the braking assembly in a power take-off according to our present invention advantageously comprises a plurality of brake pistons 8′ slidably mounted in respective cylinders or casings 10′ attached to housing 12 and symmetrically disposed about the axis of rotation 42 of shaft 1. The symmetrical arrangement minimizes and balances out wear due to braking. It is to be noted that power train 43, 18, 35, 36 generally implements, through the teeth ratios of gears 18 and 35, a stepping down of the input rotation speed.

We claim:

1. A power take-off, comprising:
   a housing;
   a power transmission speed-changing gear train rotatably journaled at least partially in said housing, said train including an output shaft;
   drive means including a drive shaft rotatably connected to an engine for supplying rotary power to said train to rotate said drive shaft;
   coupling means at least partially in said housing for drivingly connecting said drive means to said train, said coupling means including a first friction disk drivingly connected to said drive means and a second friction disk laterally juxtaposed to said first disk and drivingly connected to said train, said coupling means further including a pressure plate juxtaposed to said disks and first spring means engaging said plate for forcing same away from said disks to uncouple said train from said drive means;
   braking means in said housing for arresting rotary motion of said output shaft upon uncoupling of said drive means and said train, said braking means including a piston shiftable parallel to the movement of said plate upon hydraulic actuation of said piston to arrest said rotary motion of said output shaft, and a second spring means biasing said piston to permit said rotary motion of said output shaft; and
   hydraulic circuit means including a first pressure space adjacent to said plate opposite said disks, a second pressure space adjacent said piston and a pressure source energized by said engine and effective only during operation of said engine for pressurizing said first space to urge in opposition to said first spring means said plate against said disks to force same to clutchingly engage one another, whereby said drive means is drivingly connected to said train, and to relieve said second space whereby said second spring means releases the braking means, said second space being relieved upon inactivation of said engine.

2. The power take-off defined in claim 1 wherein said piston is shiftably mounted in a brake casing on said housing for recipocation parallel to an axis of rotation of said drive shaft to engage said plate upon depressurization of said first space and to disengage said plate at least upon de-energization of said engine.

3. The power take-off defined in claim 2 wherein said casing is integrally formed on said housing.

4. The power take-off defined in claim 1, claim 2 or claim 3 wherein said plate includes an annular flange for engaging said piston upon depressurization of said first space and consequent uncoupling of said train from said drive means.

5. The power take-off defined in claim 2 wherein said casing and said piston are provided with arresting means for limiting reciprocation strokes of said piston.

6. The power take-off defined in claim 2 wherein said braking means includes a plurality of pistons shiftably mounted on said housing symmetrically about said axis for reciprocation parallel thereto.

* * * * *